United States Patent
Matheny

(10) Patent No.: US 7,642,682 B1
(45) Date of Patent: Jan. 5, 2010

(54) INTEGRATED TURBINE AND GENERATOR

(75) Inventor: Alfred P Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 435 days.

(21) Appl. No.: 11/441,474

(22) Filed: May 26, 2006

(51) Int. Cl.
 *H02K 5/16* (2006.01)
(52) U.S. Cl. .......................................... 310/90; 415/68
(58) Field of Classification Search ................. 310/90, 310/156.11, 261; 415/68, 69, 229; 416/124, 416/125, 126, 128, 129
See application file for complete search history.

(56) References Cited

U.S. PATENT DOCUMENTS

| | | | |
|---|---|---|---|
| 1,338,122 A * | 4/1920 | Carlstedt | 464/24 |
| 2,305,454 A * | 12/1942 | Nallinger et al. | 416/128 |
| 2,465,785 A * | 3/1949 | Berno | 180/381 |
| 3,264,482 A | 8/1966 | Clark et al | |
| 4,253,031 A | 2/1981 | Frister | |
| 4,712,663 A * | 12/1987 | Teraoka | 192/58.4 |
| 4,780,746 A * | 10/1988 | Naramore et al. | 271/274 |
| 4,944,711 A * | 7/1990 | Hironaka et al. | 464/52 |
| 5,309,029 A | 5/1994 | Gregory et al. | |
| 5,376,827 A | 12/1994 | Hines | |
| 5,432,383 A | 7/1995 | Kawamura | |
| 5,709,103 A * | 1/1998 | Williams | 62/402 |
| 6,914,344 B2 | 7/2005 | Franchet et al. | |
| 6,952,061 B2 * | 10/2005 | Mogi et al. | 310/90 |
| 2004/0130224 A1 * | 7/2004 | Mogi et al. | 310/75 R |
| 2007/0093304 A1 * | 4/2007 | Cermak | 464/179 |

* cited by examiner

*Primary Examiner*—James Harvey
(74) *Attorney, Agent, or Firm*—John Ryznic

(57) ABSTRACT

A rotor shaft that drives a load and is supported by a plurality of bearings includes a first bearing to support a distal end of the shaft, a second bearing to support a distal end of the load, and a third bearing to support both proximal ends of the shaft and the load in order to dynamically uncouple the load from the rotor shaft and to eliminate a fourth bearing of the prior art. The invention is also used in a small gas turbine engine in which the turbine shaft is connected to an electric generator, and the third or middle bearing supports the proximal ends of the generator and the rotor shaft to dynamically uncouple the turbine shaft from the generator rotor.

4 Claims, 2 Drawing Sheets

INTEGRATED TURBINE AND GENERATOR

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to an integral rotor shaft and generator with bearing support, and more specifically to a small gas turbine engine with an integral electric generator and bearing support.

2. Description of the Related Art Including Information Disclosed Under 37 CFR 1.97 and 1.98

A Prior Art rotor shaft and generator unit is shown in FIG. 1. An electric generator includes a rotor or armature 114 and a stationary field coil 112. The armature 114 is rotatably connected to a rotor shaft 102 at the proximal or inner ends of the armature 114 and the shaft 102. The armature 114 is supported for rotation by a distal or forward end bearing 104 and a proximal or of end bearing 106. The rotor shaft 102 is supported for rotation by a proximal or forward end bearing 108 and a distal or aft end bearing 110. The proximal bearings are located on the proximal ends or adjacent ends of the rotor shaft 102 and the armature 114 while the distal ends are on the opposite ends. At high rotational speeds, the rotor shaft 102 will flex at points between the bearings due to the rotor dynamics of the shaft. If the electric generator is coupled to the rotor shaft 102 as in the FIG. 1 structure, the proximal or forward end of the shaft will flex in the radial direction and cause the generator to vibrate excessively. What is needed in the Prior Art of rotor shafts that drive an electric generator is a way to de-couple the generator from the rotor dynamics of the rotor shaft.

In the field of gas turbine engines, the engine includes a compressor driven by a rotor shaft to compress air, a combustor to burn the compressed air with a fuel to produce a hit gas stream, and a turbine connected to the rotor shaft to convert a portion of the hot gas stream to mechanical energy to drive the compressor. It is known in the prior art of gas turbine engines to connect an electric generator to the gas turbine engine in order to use the mechanical power from the rotor shaft to drive the generator and produce electric power for use in the engine. Small gas turbine engines operate at higher rotational speeds due to the smaller diameter size of the engine. Thus, the rotor dynamics of the engine are significant design problems.

U.S. Pat. No. 5,376,827 issued to Hines on Dec. 27, 1994 and entitled INTEGRATED TURBINE-GENERATOR discloses an integrated turbine and generator with dual rotor having a first electric generator connected to the outer rotor and a second electric generator connected to the inner rotor. The second electric generator is connected directly to the inner rotor shaft at a location downstream from the turbine section. Hines et al discloses that a conventional roller bearing supports the output shaft of the inner rotor.

In a small gas turbine engine, the rotor shaft rotates at a higher speed than does a larger gas turbine engine. If a small gas turbine engine was to connect a generator directly to the shaft as in the Hines patent above, the rotor dynamics of the rotor shaft would be so large that the generator would be affected as well. The part of the shaft extending past the bearing 66 would vibrate too much that the generator would suffer from the vibrations. It is thus necessary to isolate the rotor dynamics of the shaft from the generator.

An object of the present invention is to provide for an electric generator to be de-coupled the rotor dynamics of the shaft that drives the generator.

Another object of the present invention is to reduce the weight of the electric generator and rotor shaft assembly by reducing the number of parts.

Another object of the present invention is to provide for a small gas turbine engine with an electric generator that can be easily installed or removed from the rotor shaft.

Another object of the present invention is to provide for a small gas turbine engine with an electric generator in which the generator is de-coupled from the rotor dynamics of the rotor shaft.

Another object of the present invention is to reduce the weight of a small gas turbine engine.

These objects and others will become apparent from the detailed description of the invention that follows.

BRIEF SUMMARY OF THE INVENTION

A gas turbine engine with an integral electric generator in which the rotor shaft of the engine is supported for rotation by a foreword or upstream bearing and a rearward or downstream bearing, and the electric generator is supported for rotation by an upstream generator bearing and the foreword rotor shaft bearing such that only three bearings are used to rotationally support the generator and the rotor shaft. The electric generator is easily inserted into the front section of the rotor shaft, and the front bearing of the rotor shaft supports the generator so that the rotor dynamics of the rotor shaft does not affect the generator and an extra bearing to support the generator is not needed.

DETAILED DESCRIPTION OF THE INVENTION

Figure 1:
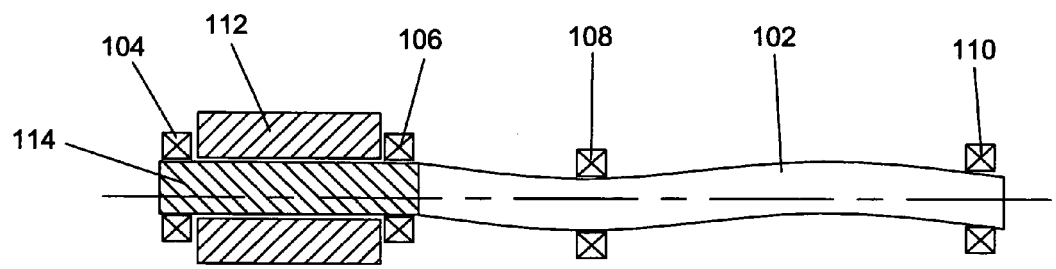
FIG. 1 shows a Prior Art electric generator and rotor shaft connection with bearing support.

The present invention is directed to a rotor shaft and electric generator assembly that is supported by a number of bearings. In FIG. 2, the generator includes a stationary field coil 112 and a rotating armature 114. The armature 114 is rotatably connected to a rotor shaft 102. The rotor shaft 102 is supported by a distal or aft end bearing 110 and a proximal or forward end bearing 108. The proximal or forward end of the rotor shaft (the end adjacent to the generator) includes a hollow portion in which a projection of the armature 114 fits within. Splines between the armature and the shaft can be used to force the armature to rotate along with the shaft. Any well known means to connect the armature to the shaft can be used. Thus, the proximal or aft end of the armature is also supported by the common or middle bearing 108. The distal or forward end of the armature is supported by a bearing 104. Thus, only three bearings are needed to support both the rotor shaft 102 and the armature 114 of the generator instead of the four bearings in the Prior Art FIG. 1 arrangement. The common or middle bearing 108 that supports the proximal or forward end of the shaft 102 and the aft end of the armature 114 de-couples the generator from the rotor dynamics of the shaft 102 and reduces the weight of the generator and shaft assembly by eliminating one of the four bearings needed in the Prior Art FIG. 1 arrangement.

Figure 3:
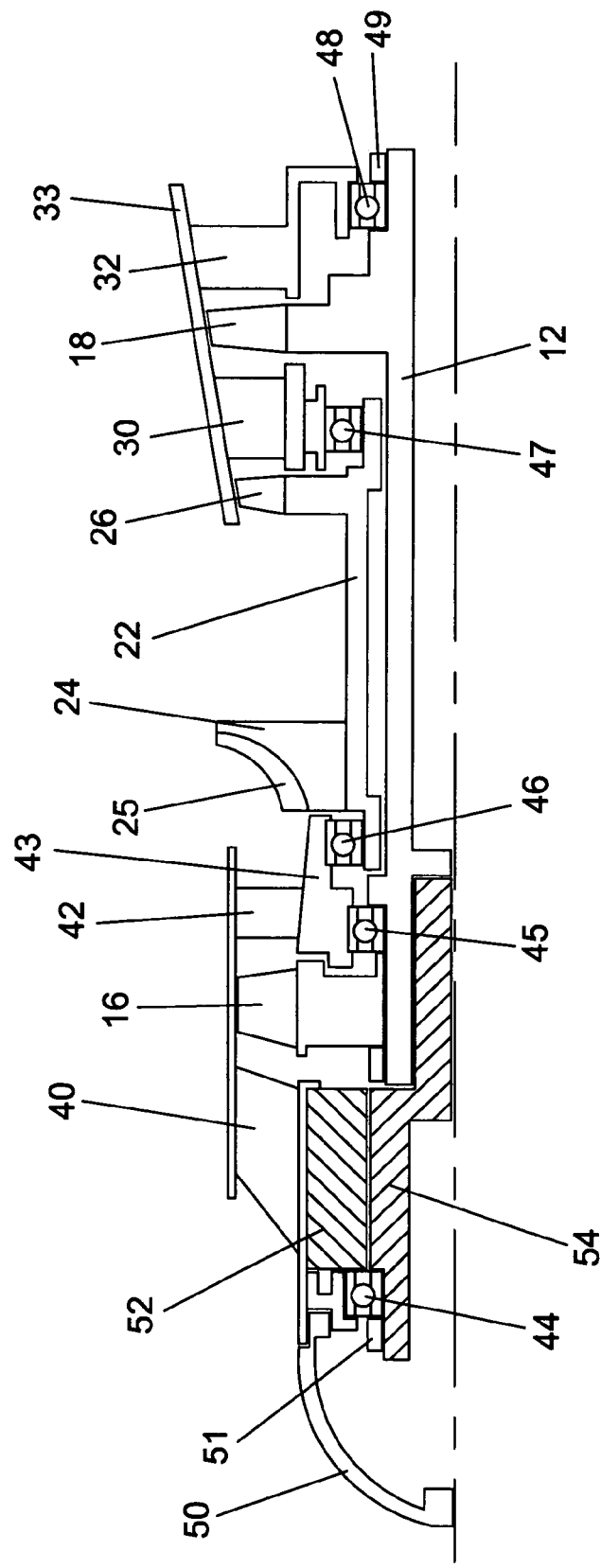
FIG. 3 shows a cross section view of the gas turbine engine and electric generator of the present invention with the de-coupled bearing arrangement.

FIG. 3 shows the present invention used in a gas turbine engine, where the engine includes an inner rotor shaft 12, a compressor blade 16 connected to the upstream end of the inner rotor shaft 12, and a turbine blade 18 connected to a downstream end of the inner rotor shaft 12. An outer rotor shaft 22 includes an impeller 25 on a rotor disk 24 connected on an upstream or forward end of the outer rotor shaft 22 and a turbine blade 26 connected on the downstream or aft end. A combustor (not shown) is located between an outlet of the impeller 25 and an inlet of the turbine blade 26. Positioned between the impeller 25 and compressor blade 16 is a guide vane 42 supported by the engine casing and extending from the casing toward the rotor shafts. The inlet guide vane 42 includes an inner shroud 43 with bearing supports on the inner surface. The inner shroud 43 supports a first bearing 45 and a second bearing 46. The first bearing 45 rotatably supports the front or forward end of the inner rotor shaft 12 while the second bearing 46 rotatably supports the front or forward end of the outer rotor shaft 22. A first stage nozzle 30 extends from an outer shroud 33 of the engine casing and is located between the first stage turbine blade 26 and the second stage turbine blade 18. A second stage nozzle 32 also extends from the engine casing and is located downstream from the second stage turbine blade 32. The first stage nozzle 30 includes an inner shroud that forms a support for a third bearing 47 while the second stage nozzle includes an inner shroud that forms a support for a fourth bearing 48. The third bearing 47 rotatably supports a rear or aft end of the inner rotor shaft 22 while the fourth bearing 48 rotatably supports the rear or aft end of the inner rotor shaft 12.

An inlet guide vane 40 is located upstream of the compressor and acts to guide the airflow into the compressor. The inlet guide vane 40 is supported by the engine casing and includes an inner shroud that supports a fifth bearing 44. An engine nose cowling 50 forms an air inlet guide to direct airflow into the inlet guide 40. A stop member 51 is secured onto the armature 54 to prevent the fifth bearing 44 from sliding off of the armature 54. A similar stop member 49 is used on the other end of the shaft to secure bearing 48 in place on the shaft 12.

Mounted in the front end of the engine is an electric generator which includes a field coil 52 and an armature 54. Relative rotation of the armature 54 with respect to the field coil 52 produces an electric current. FIG. 3 shows the armature 54 to rotate while the field coil 52 remains fixed to the engine casing. However, the field coil could rotate while the armature remains fixed to the casing. Or, both could rotate in opposite directions. The armature 54 is shown to extend rearward such that it can slide into a hollow opening of the inner shaft 12. One key feature of the present invention is that the first bearing 45 that supports the forward end of the inner shaft 12 also supports the rearward or aft end of the electric generator via the armature 54. At least two bearings are needed to rotatably support the armature 54 in the generator. By locating the forward end of the armature 54 as disclosed by the present invention, only one additional bearing is needed (fifth bearing 44) to support the armature 54. The fifth bearing 44 rotatably supports the forward end of the armature 54. Because the first bearing 45 supports the inner rotor shaft 12 and the rearward or aft end of the armature 54, the rotor dynamics of the inner rotor shaft 12 does not affect the armature 54 and therefore the generator. Also, according to the design of the present invention, the generator can easily be replaced in the engine by removing the nose cowling 50 and sliding the armature 54 out of the inner shaft 12. So that the armature 54 will rotate along with the inner shaft 12, a series of splines and grooves are located on the mating surfaces to transfer torque. Other well known connections can also be used to transfer torque from the inner rotor shaft 12 to the armature 54 of the generator.

Figure 2:
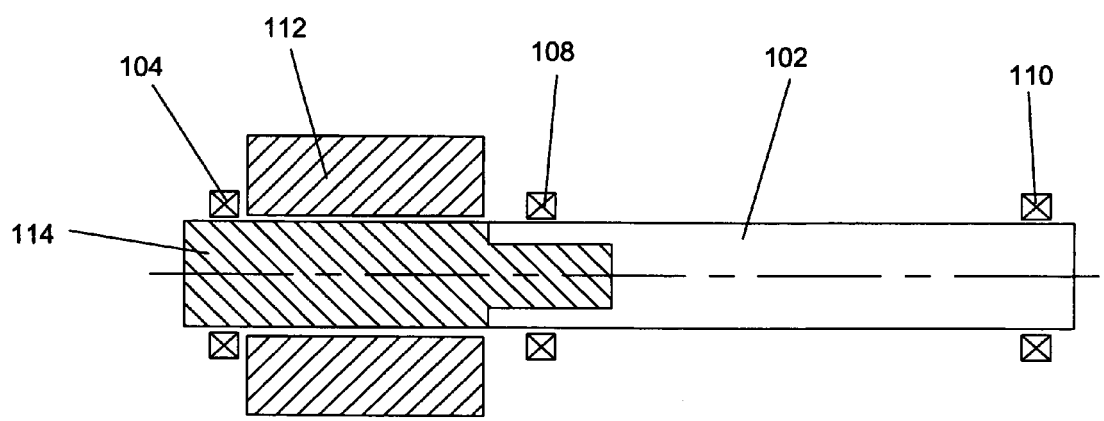
FIG. 2 shows the present invention with an electric generator and rotor shaft supported by bearings in which the generator is de-coupled from the rotor dynamics of the shaft.

The FIG. 1 embodiment shows the armature 54 supported in a twin rotor turbine. However, the principal of the present invention could be used in a single shaft turbine. The present invention is also envisioned for use in a turbo machine such as steam turbine in which no combustor is used and the turbine is supported by bearings. The turbine shaft and one end of the generator is supported by a common bearing in order decouple the generator from the rotor dynamics of the turbine shaft and to allow for easy replacement of the generator in the steam turbine.

I claim:

1. A small gas turbine engine comprising:
a rotor shaft having a forward end and an aft end;
a turbine connected near to the aft end of the rotor shaft;
a compressor connected near to the forward end of the rotor shaft;
an electric generator rotatably connected to the forward end of the rotor shaft; and,
the electric generator and the rotor shaft being supported by only three bearings that include a first bearing that supports a forward end of the electric generator, a third bearing that supports the aft end of the rotor shaft, and a second bearing that supports both the aft end of the electric generator and the forward end of the rotor shaft.

2. The small gas turbine engine of claim 1, and further comprising:
the small gas turbine engine is less than 300 pounds thrust.

3. The small gas turbine engine of claim 1, and further comprising:
the electric generator includes an armature with an aft end that fits within the forward end of the rotor shaft.

4. The small gas turbine engine of claim 3, and further comprising:
the aft end of the armature extends axially within the rotor shaft beyond the second bearing.

\* \* \* \* \*